United States Patent [19]

Shiota

[11] Patent Number: 4,965,662
[45] Date of Patent: Oct. 23, 1990

[54] VIDEO PRINTER FOR MAKING VIDEO IMAGE HARD COPIES

[75] Inventor: Kazuo Shiota, Kanagawa, Japan

[73] Assignee: Fuji Photo Film Co., Ltd., Kanagawa, Japan

[21] Appl. No.: 225,975

[22] Filed: Jul. 29, 1988

[30] Foreign Application Priority Data

Jul. 29, 1987 [JP] Japan .................................. 62-189387
Jul. 29, 1987 [JP] Japan .................................. 62-189388

[51] Int. Cl.$^5$ ............................................. H04N 1/46
[52] U.S. Cl. ...................................... 358/78; 358/160; 358/443
[58] Field of Search ............... 358/21 R, 78, 160, 244, 358/280, 443, 445, 451; 355/20

[56] References Cited

U.S. PATENT DOCUMENTS

| | | | |
|---|---|---|---|
| 4,282,546 | 8/1981 | Reitmeier | 358/183 |
| 4,467,356 | 8/1984 | McCoy | 358/146 |
| 4,468,693 | 8/1984 | Fujita et al. | 358/78 |
| 4,496,974 | 1/1985 | Heitmann | 358/180 |
| 4,650,929 | 3/1987 | Boerger et al. | 358/183 |
| 4,740,820 | 4/1988 | Endo | 355/20 |
| 4,780,756 | 10/1988 | Shiota et al. | 358/78 |
| 4,807,046 | 2/1989 | Nakatani | 358/280 |

Primary Examiner—John W. Shepperd
Assistant Examiner—Michael D. Parker
Attorney, Agent, or Firm—Sughrue, Mion, Zinn, Macpeak & Seas

[57] ABSTRACT

A video signal from an input unit is supplied to first and second low-pass filters. A selector picks up a video signal which has passed through the first low-pass filter if a single frame image is to be printed, and picks up a video signal which has passed through the second low-pass filter if a multifreeze image is to be printed. The picked-up video signal is sampled and quantized by an A/D converter and stored in a first memory. The video signal in the first memory is read out to print a signal frame image. To print a multifreeze image, the video signal stored in the first memory is thinned to reduce the size of an image and thereafter is stored in a second memory having a larger capacity than that of the first memory. A plurality of frames are inlaid within one frame at the second memory. Thereafter, the video signal in the second memory is read out to print a multifreeze image.

7 Claims, 3 Drawing Sheets

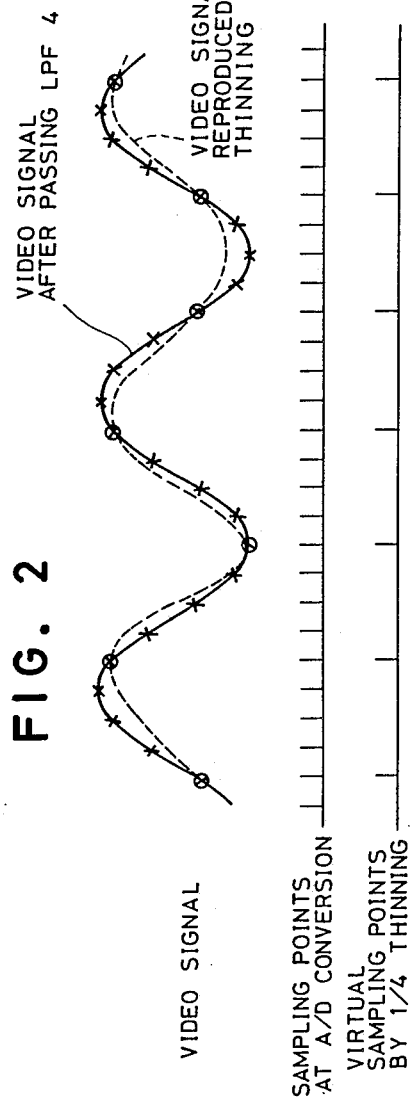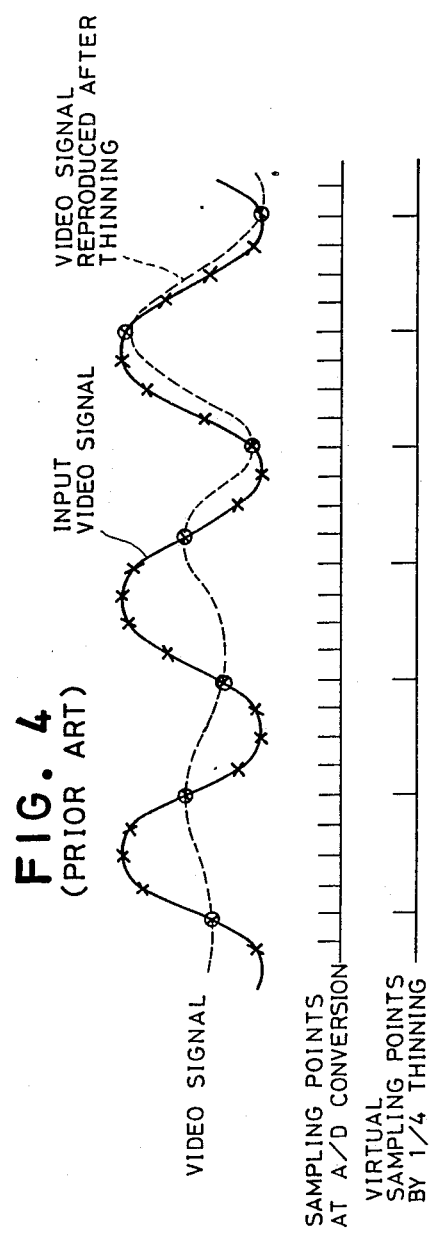

VIDEO PRINTER FOR MAKING VIDEO IMAGE HARD COPIES

BACKGROUND OF THE INVENTION

The present invention relates to a video printer for making a hard copy of a video image, and more particularly to a video printer for making a hard copy of a single frame image as well as a composite image comprising a plurality of sub-frame images reduced in size and inlaid within a single frame.

Known video printers for making a hard copy of a video image include CRT type video printers, laser video printers, thermal transfer type video printers, ink jet type video printers and the like. Signals such as video signals from a video tape, real time video signals from a television camera, video signals from a video floppy on which images photographed by a electronic still camera have been recorded, are inputted to video printers of this type. An inputted video signal is supplied to a low-pass filter sampled and quantized by an A/D converter, and temporarily stored in a frame memory. The A/D converter samples the inputted video signal at a sampling frequency greater than twice the cut-off frequency of the low-pass filter so as to satisfy the sampling theorem. Video signals (image data) read out from the frame memory are subjected to color correction, size reduction/magnification, image synthesizing and the line and then are set to a printer unit to make a hard copy of the image data.

It has been desired for a video printer of this type to make an index sheet by which all scenes or main scenes can be seen at once. To this end, an attempt has been made to make a composite image of a plurality of sub-frame images reduced in size by inlaying the images within a single frame (such a composite image will be referred to hereinafter as a multifreeze image). An attempt also has been made to make a multi-print or a hard copy of the composite image, and to make a multi-print of a plurality of the same sub-frame images reduced in size and disposed in matrix fashion within the print, for the purpose of using each sub-frame image by attaching on a name card.

However, if a multifreeze image of a plurality of sub-frame images, e.g., 16 sub-frame images (being either the same or different), inlaid within a single frame is to be made, it becomes necessary to thin the video signal by "1/16". As a result, the resolution of the reproduced image is considerably degraded.

Thinning of the video signal is performed in order to make a multifreeze image of 4×4 sub-frame images so that the virtual sampling frequency at the A/D converter becomes "¼". For example, even if a video signal of 4.5 MHz is sampled at 12 MHz. which is greater than 2×4.5 MHz, the virtual sampling frequency after the thinning becomes 3 MHz, thus failing to satisfy the sampling theorem. FIG. 4 illustrates such a case wherein a reproduced video signal (dotted line) is not a faithful reproduction of an original (inputted) video signal (solid line). A multi-print with poor reproduction fidelity will cause image quality deterioration such as moire with patterns resembling water ripples, or jagged slanted lines. Such image quality deterioration results from so-called turnaround noises due to lack of compliance with the Nyquist requirement (sampling theorem), as a result of which the lower side band component of the sampling frequency is superposed upon the original signal.

SUMMARY OF THE INVENTION

In view of the foregoing, it is one object of the present invention to provide a video printer capable of making a high quality hard copy of a multifreeze image with high resolution and high reproducibility.

The above and other objects and advantages of this invention are achieved by a video printer which has a first memory for temporarily storing one frame of an inputted video signal; a second memory having a storage capacity X times as large as the first memory in the horizontal scan direction and Y times as large as the first memory in the vertical scan direction; and circuitry and apparatus for making a multifreeze image of M sub-frames in the horizontal scan direction and N sub frames in the vertical direction, the sub-frames being inlaid within a single frame, by reading the video signal stored in the first memory while thinning the video signal by X/M in the horizontal scan direction and by Y/N in the vertical scan direction and by writing the thinned video signal in a predetermined area of the second memory. In order to obtain excellent image reproducibility for both a single frame image and a multifreeze image, there is provided further a first low-pass filter, having a bandwidth approximately the same as that of an inputted video signal, for passing the low frequency component of the video signal, a second low-pass filter, having a bandwidth narrower than that of the first low-pass filter, for passing the low frequency component of the video signal and means for selectively picking up one of the outputs from said first and second low-pass filters. Thus the bandwidth of the video signal is lowered prior to sampling so that the virtual sampling frequency does not become lower than one-half the video signal frequency, thus complying with the Nyquist requirement.

According to the present invention, the number of memory pixels of the second memory is larger than that of the first memory, so that the thinning factor for a video signal stored in the first memory can be reduced and hence a multifreeze image with high resolution and without distortion can be obtained. Further, since the two low-pass filters are selectively used so that the inputted video signal frequency does not become greater than half the virtual sampling frequency, a hard copy of a multifreeze image can be obtained while still satisfying the sampling theorem. As a result, a multifreeze image can be realized without moire compared with the conventional approach and with less image quality deterioration.

BRIEF DESCRIPTION OF THE DRAWINGS

The above and other objects of the present invention will become apparent from the following detailed description when read in connection with the accompanying drawings, wherein:

FIG. 2 shows waveforms for illustrating sampling of a video signal for making a multifreeze image:

FIG. 4 shows waveforms for illustrating conventional sampling of a video signal for making a multifreeze image.

DETAILED DESCRIPTION OF THE PREFERRED EMBODIMENT

Figure 1:
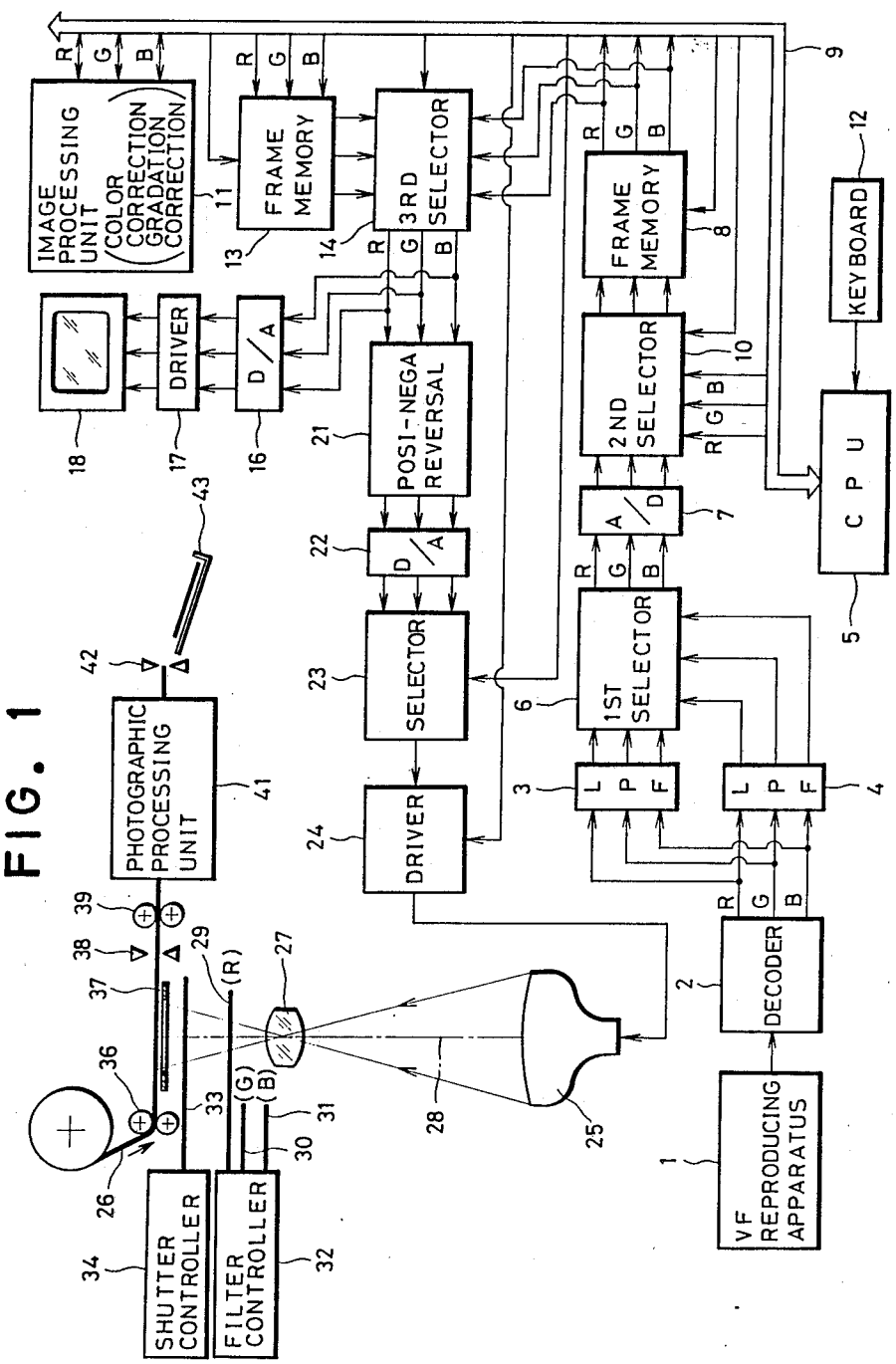
FIG. 1 is a schematic block diagram showing a embodiment of a video printer according to the present invention.

Referring now to FIG. 1 showing a block diagram of an embodiment of the CRT video printer according to this invention, among various image input units such as a color TV camera, a video reproducing apparatus and the like, a video floppy (VF) reproducing apparatus 1 is used in this embodiment. The VF reproducing apparatus is mounted with a video floppy on which images have already been recorded. A video signal, e.g., a color image recorded on the video floppy is reproduced. The reproduced video signal, which is an NTSC signal, is separated by a decoder 2 into a red video signal R, green video signal G and blue video signal B. The three color video signals, each of which has a bandwidth of approximately 4.5 MHz, are sent to low-pass filters (LPFs) 3 and 4 which are connected in parallel. The LPFs 3 and 4 cut the high frequency component of the video signal to derive therefrom a signal component having a bandwidth narrower than half the sampling frequency. The LPF 3 has approximately the same bandwidth W1 as the video signal (4.5 MHz), so that almost all the inputted video signal is passed therethrough. The LPF 4 is provided to make a multifreeze image. The bandwidth of the LPF 4 is determined such that the virtual sampling frequency after the thinning of a video signal satisfies the sampling theorem. In particular, the bandwidth W2 of the LPF 4 is such that the inputted video signal bandwidth is less than $fs/(2 \times Tx)$, where fs is the sampling frequency of an A/D converter 7 and 1/Tx is the thinning factor in the horizontal scan (CRT raster) direction.

Figure 3:
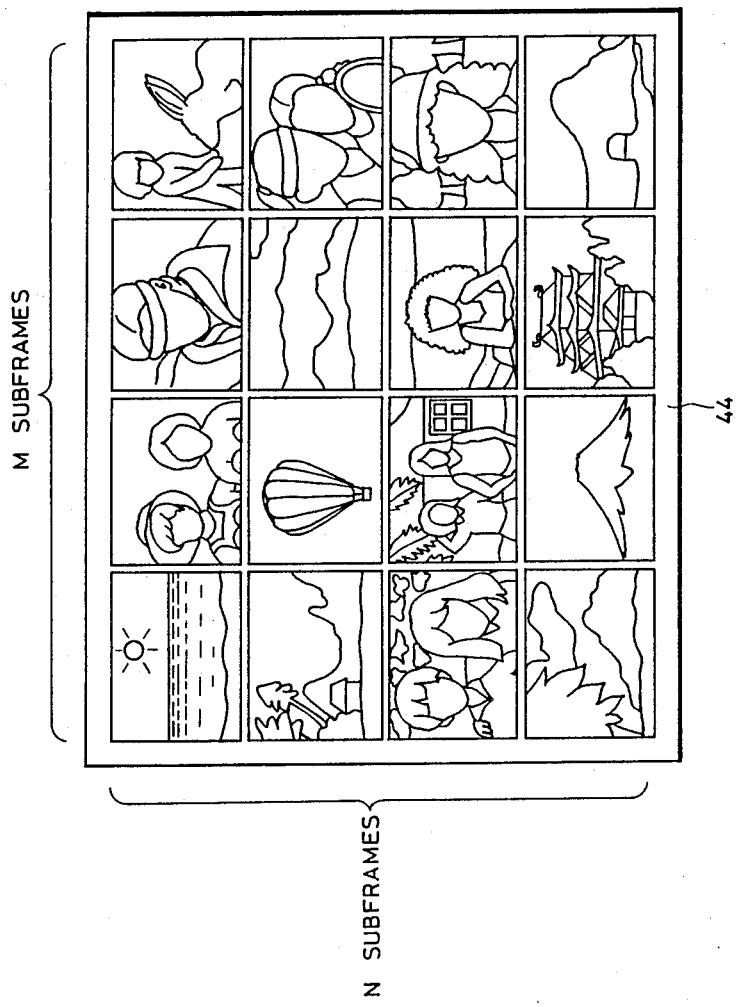
FIG. 3 shows an example of a multifreeze image formed by using the video printer shown in FIG. 1.

Assuming that the number of sub-frames of a multifreeze image is M in the horizontal scan direction and N in the vertical scan direction, as shown in FIG. 3, and that the number of memory pixels of a frame memory 13 (which will be described later) is X times as large as that of a frame memory 8 (which also will be described later) in the horizontal scan direction and Y times as large in the vertical scan direction, then the thinning factors 1/Tx and 1/Ty in the horizontal and vertical scan directions are expressed by the following equations:

$$1/Tx = X/M$$

$$1/Ty = Y/N$$

Therefore, the bandwidth W2 of the LPF 4 is expressed by the following equation:

$$W2 = (fs \times X)/(2 \times M) \quad (1)$$

For the situation in which the number of memory pixels in both of the frame memories 13 and 8 is the same i.e., if X=1, the equation (1) becomes:

$$W2 = fs/(2 \times M) \quad (2)$$

In case of a multifreeze image constructed of 4×4 subframes as shown in FIG. 3, the bandwidth W2 of the LPF 4 becomes 1.5 MHz with the sampling frequency fs=12 MHz of an A/D converter 7. In this case, the LPF 4 for passing the signal component lower than 1.5 MHz of a video signal is used.

In the embodiment of this invention, however, since X and Y are set to be "2" and the frame memory 13 has four times the memory capacity of the frame memory 8, the LPF 4 having a bandwidth W2 of 3 MHz can be used. The thinning factors in the horizontal and vertical directions are "½" in this case, so that the video signal in the frame memory 8 is read every second pixel.

The three color video signals outputted from the LPF 3 or 4 are selectively picked up by a first selector 6 under control of a CPU 5 and are sent to the A/D converter 7 which samples an inputted analog video signal at a sampling frequency fs set at 12 MHz and quantizes the sampled video signal for output as a digital signal.

The video signal digitized by the A/D converter 7 is sent to a second selector 10 which selectively picks up a video signal supplied from the A/D converter 7 or a video signal inputted from a bus line 9 and supplies the same to the frame memory 8. The frame memory 8 is constructed of three memory areas for separately storing red, green and blue video signals. Each memory area has an information storage capacity corresponding to, e.g., 640×480 pixels. The read/write operation thereof is effected in accordance with a command signal from the CPU 5.

The three color video signals read out of the frame memory 8 are sent via the bus line 9 to an image processing unit 11 which causes the video signal sent from the frame memory 8 to be subjected to a color correction process and a gradation correction process. In the case of a multifreeze image composed of a plurality of sub-frame images to be inlaid within a single frame, the video signal is read from the frame memory 8 while thinning is carried out in both the horizontal and vertical scan directions to effect size reduction, and the video signal is sent to the image processing unit 11 via the bus line 9. After being subjected to image processing at the image processing unit 11, the video signal is sent to a second selector 10 or the frame memory 13, respectively, via the bus line 9.

The frame memory 13 has three memory areas for separately storing red, green and blue video signals. Since X and Y are set to be "2" in this embodiment as described before, the number of pixels in the read memory area for example of the frame memory 13 is four times larger than the number of pixels (640×480 pixels) of the read memory area of the frame memory 8, i.e., "1280×960" pixels. Since the storage capacity of the frame memory 13 is four times larger than that of the frame memory 8, the thinning factors of a video signal in both the horizontal and vertical scan directions may be "½", thus advantageously improving the resolution. If the storage capacities of the frame memories 13 and 8 are set to be the same, then the thinning factors in the horizontal and vertical scan directions become "¼".

An image monitoring system includes a D/A converter 16, a driver 17, and a monitor 18 made of, e.g., a color CRT. The monitor 18 displays a single frame color positive image or a multifreeze image. A printing system includes a posi-nega reversal circuit 21, a D/A converter 22, a selector 23, a driver 24, and a monochrome CRT 25. The driver 24, responding to an instruction from the CPU 5, changes the number of scanning lines for one frame according to printing modes, namely the multi-print in which image data in the frame memory 13 is used and the single-frame printing in which image data in the frame memory 8 is used.

As is well known in this art, the scanning line number changing can be effected by selecting two vertical scanning control circuits which control a scanning beam in the CRT 25 to deflect at different angles. The CRT 25 sequentially displays monochrome images of the red, green and blue images (negative images) of each color video signal selectively picked up by the selector 23. A photosensitive material 26 e.g., a color photographic paper 26, is placed facing the CRT 25 so that the image displayed on the CRT 25 is focused by an exposure lens 27 on the color paper 26. Near the optical path of the exposure lens 27, there are disposed red, green and blue color filters 29, 30 and 31. While exposing a video image, a filter controller 32 sequentially inserts the color filters 29 to 31 into the optical path 28 to thereby conduct a frame sequential exposure through the additive color process. A shutter 33 is controlled to be opened and closed by a shutter controller 34, once for each color and hence three times in total.

The color paper 26, wound in a roll, is intermittently pulled by a pair of rollers 36 so as to be set at an exposure station at the back of a mask 37. After a predetermined number of frames are exposed each at the exposure station, the necessary portion of the color paper 26 is cut and separated from the color paper 26, and is fed to a photographic processing unit 41 at which a necessary portion of generally elongated rectangular shape is subjected to photographic processing at respective processing tubs, and finally is cut and separated into respective frames by a cutter 42 and ejected into a tray 43.

The operation of the above embodiment now will be described. A command to make a hard copy of a single frame of a video image is issued by operating a keyboard 12. The VF reproducing apparatus 1 starts reproducing the video image. One frame of the NTSC signal outputted from the VF reproducing apparatus 1 is separated into three color video signals by the decoder 2. The three color video signals are inputted to the LPFs 3 and 4 to be subjected to bandwidth limitation. The selector 6 picks up the video signals which have passed through the LPF 3 and hence have a bandwidth of 4.5 MHz, and send them to the A/D converter 7.

The A/D converter 7 samples and digitizes the video signals and sends them to the frame memory 8. The three color signals stored in the frame memory 8 are read out therefrom at a predetermined period and are sent via the bus line 9 to the image processing unit 11 in which they are subjected to color correction and gradation correction. The image-processed video signals are sent back to the frame memory 8 via the bus line 9 and the second selector 10. Thereafter, they are sent to the image monitoring system via a third selector 14 to display on the monitor 18 the video image to be printed. If the image processing observed by monitoring the video image on the monitor 18 is considered good the keyboard 12 is operated to input a print command to the CPU 5 which in turn activates the printing system to make a hard copy of one frame of the video image. In particular, in this case, the image-processed video signals read out from the frame memory 8 are sent to the selector 23 via the third selector 14, the posi-nega reversal circuit 21, and the D/A converter 22. The selector 23 first picks up, e.g., a red color video signal, and sends it via the driver 24 to the monochrome CRT 25 to display a monochrome image converted from the luminance of the red color video signal. While the CRT 25 displays the monochrome image, the red color filter 29 is inserted into the optical path 28 so that the image on the CRT 25 is converted into a red color image. Then, the shutter 33 is maintained open for an exposure time that is determined in accordance with the red color sensitivity of the color paper 26, to expose the red color image on the color paper 26 accordingly.

After the exposure of the red color image, the shutter 33 is closed and the green color filter 30 is inserted into the optical path in place of the red color filter 29. The green color video signal is then displayed on the CRT 25 as a monochrome image. Immediately thereafter, the shutter 33 again is opened so that the green color image converted from the monochrome image on the CRT 25 by the green color filter 30 is exposed on the color paper 26. In a similar manner, the green color video signal displayed on the CRT 25 is exposed on the color paper 26 to complete the frame sequential exposure using the additive color process.

The VF reproducing apparatus 1 sequentially reproduces the video image of one frame in the above manner to expose it on the color paper 26. After a predetermined number of frames are exposed on the color paper 26, the cutter 38 is actuated to cut and separate the exposed portion of the color paper 26. The separated color paper 26 is subjected to photographic processing at the photographic processing unit 41 and thereafter is cut and separated into respective frames and ejected into the tray 43.

Next, if a command to make a hard copy of a multi-freeze image by operating the keyboard 12 is issued, then the VF reproducing apparatus 1 starts sequentially reproducing video images in groups of 16 consecutive frames. The video signal for each frame is separated into three color video signals by the decoder 2. The three separated color video signals are inputted to the LPFs 3 and 4. Since the first selector 6 selects the LPF 4 in the case of a multifreeze image, the video signals which have passed through the LPF 4 and hence have a bandwidth of 3 MHz are sent to the A/D converter 7.

The A/D converter 7 samples the video signals at the sampling frequency of 12 MHz and converts them into digital video signals which are sent to the frame memory 8. The CPU 5 then causes the digital video signals in the frame memory 8 to be read out therefrom in such a manner that they are thinned by "$\frac{1}{4}$" in both the horizontal and vertical scan directions to thereby reduce the size of a frame into a sub-frame size.

The thinned video signals then are sent to the image processing unit 11 to be subjected to color and gradation correction and thereafter are written in a predetermined area of the frame memory 13. In the above manner, thinned video signals of respective sub-frames are written in the frame memory 13. Then, the composite image of 16 sub-frames is displayed on the monitor 18. After it is confirmed on the monitor 18 that 16 sub-frames of the thinned video signals have been written, the keyboard 12 is operated to issue a print command to the CPU 5 so that the video signals of the frame memory 13 corresponding to the composite image of 16 sub-frames inlaid within one frame on the frame memory 13 are read out therefrom and are sent to the printing system. In a manner similar to the case of the above-described one frame video image printing, the three color images of the multifreeze image are sequentially displayed on the CRT 25 to expose them on the color paper 26 by means of the frame sequential exposure using the additive color process. After the exposure and development, a multi-print photograph 44 as shown in FIG. 3 is obtained.

Since the frame memory 13 has a storage capacity four times as large as that of the frame memory 8, the number of effective scan lines and the number of pixels on each scan line become twice as large, respectively, as those obtained from video signals read out of the frame memory 8. Therefore, a multifreeze with high resolution can be displayed on the CRT 25, and hence a multiprint photograph 44 with high fidelity can be obtained. In the above embodiment, a sub-frame at the left end on the first line is inlaid within a frame as a first step at a first time, and a second sub-frame on the first line next is inlaid as a second step at a second time. Thus, a sub-frame at the right end on the fourth line is inlaid at the 16th step. If 12 sub-frames are to be printed in the multiprint photograph 44 having 16 sub-frames as shown in FIG. 3, there are no sub-frames on the fourth line, and this area is left as a white portion. The multifreeze image may be constructed of 3×3 sub-frames or 4×3 sub-frames. Also, margins between sub-frames may be removed.

FIG. 2 illustrates the operation and effect of the low-pass filter 4 used in producing a multifreeze image. In the embodiment of the present invention as described above, the storage capacity of the frame memory 13 is set to be four times as large as that of the frame memory 8, so that the thinning factors in both the horizontal and vertical scan directions are "½" for a multifreeze image. However, for easy comparison with the prior art example shown in FIG. 4, the thinning factor is assumed to be "¼" in FIG. 2. As seen from FIG. 2, the video signal after thinning (indicated by a broken line) can reproduce with high fidelity the video signal before thinning (indicated by a solid line). The reason for this is that according to the present invention, the virtual sampling frequency after thinning can satisfy the sampling theorem with respect to the video signal bandwidth whose high frequency band is limited by the LPF 4. If the LPF 3 is used instead of the LPF 4 to produce a multifreeze image, the video signal having a high frequency band is sampled by the A/D converter because of the cut-off frequency (4 MHz) of the LPF 3. In such a case, the result is the same as in the conventional case, so that the video signal after thinning takes a waveform indicated by a dotted line as shown in FIG. 4, thus making it impossible to reproduce a video image with high fidelity.

In the above description of the preferred embodiment, although one frame image printing and multifreeze image printing have been conducted independently, they may be performed in parallel. That is, after one frame of a video image is printed, one frame of the video signal is thinned and stored in the frame memory 13. The above operation is repeated to prepare the thinned video signals for a multifreeze image of 16 sub-frames. In this case, it is convenient to arrange the video printer to automatically make a freeze image of 16 sub-frames. Even if the number of sub-frames is not 16, the video images of all frames in a video floppy are printed, a hard copy of a multifreeze image made of fewer than 16 sub-frames is made automatically, upon issuance of an appropriate command from the keyboard 12. Further, a small numeral indicating the order of inlaying sub-frames may be printed at the corner of each sub-frame.

Further, in the above embodiment, the description has been directed to the reproduction of a video floppy with frame recording by an electronic still camera. However, field recording by an electronic still camera also is known. In this case, video signals recorded on one of the two tracks of the field recording are picked up and stored in the frame memory 8 as one frame video signal. Furthermore, a silver salt type video printer using a CRT and a photosensitive material has been used in the above embodiment. However, the present invention also is applicable to ink jet type video printers, laser video printers and the like.

While there has been described a preferred embodiment of the invention, obviously modifications and variations are possible in light of the above teachings. It is therefore to be understood that within the scope of the appended claims, the invention may be practiced in manners other than as specifically described.

What is claimed is:

1. A video printer having a printing unit for obtaining a hard copy of a video image, said video printer comprising:
    a first memory for storing one frame of an inputted video signal;
    a second memory having a storage capacity X times as large as said first memory in the horizontal scan direction and Y times as large as said first memory in the vertical scan direction, where X and Y are positive integers:
    means for making a multifreeze image, comprising M sub-frames in the horizontal scan direction and N sub-frames in the vertical direction, said sub-frames being inlaid within a single frame, by reading the video signal stored in said first memory while thinning said video signal by a first factor of X/M in the horizontal scan direction and by a second factor of Y/N in the vertical scan direction to reduce the size of said video image, and by writing said thinned video signal in a predetermined area of said second memory: and
    means for reading a video signal from said first memory when a hard copy of one frame video image is to be made, and reading a video image from said second memory when a hard copy of a multifreeze image is to be made.

2. A video printer according to claim 1, wherein the data in said second memory is cleared before a multifreeze image forming operation is initiated.

3. A video printer according to claim 2, wherein said first and second memories each comprise three memory areas for respectively storing three primary color video signals.

4. A video printer according to claim 3, wherein M and N are 4, and X and Y are 2.

5. A video printer according to claim 1, further comprising:
    a first low-pass filter, having a first bandwidth approximately equal to that of an inputted video signal, for passing the low frequency component of said inputted video signal as a first output;
    a second low-pass filter, having a second bandwidth narrower than that of said first low-pass filter, for passing the low frequency component of said inputted video signal as a second output;
    means for selectively picking up the first output from said first low-pass filter when a hard copy of one frame of a video signal is to be made, and picking up the second output from said second low-pass filter when a hard copy of a multifreeze image is to be made; and
    means, connected between said selective pick-up means and said first memory, for sampling said one of said first and second outputs picked up by said selective pick-up means.

6. A video printer according to claim 5, wherein said second bandwidth of said second low pass filter is narrower than $(fs \times X)/(2 \times M)$, where fs is the sampling frequency of said sampling means.

7. A video printer according to claim 6, wherein said printing unit comprises:
   a monochrome CRT;
   three primary color filters disposed for selective insertion between said monochrome CRT and a photosensitive material; and
   an exposure lens for focusing a video image displayed on said monochrome CRT on said photosensitive material.

* * * * *